(12) United States Patent
Gopalakrishnan et al.

(10) Patent No.: US 9,712,698 B1
(45) Date of Patent: Jul. 18, 2017

(54) CUSTOMIZED COLOR FOR MULTIPLE RASTER CONTENT FORMAT FILE

(71) Applicant: XEROX CORPORATION, Norwalk, CT (US)

(72) Inventors: Sainarayanan Gopalakrishnan, Chennai (IN); Xing Li, Webster, NY (US); Rajasekar Kanagasabai, Chennai (IN); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/001,295

(22) Filed: Jan. 20, 2016

(51) Int. Cl.
| | |
|---|---|
| *H04N 1/00* | (2006.01) |
| *H04N 1/40* | (2006.01) |
| *H04N 1/60* | (2006.01) |
| *H04N 1/04* | (2006.01) |
| *G06K 15/02* | (2006.01) |
| *G06F 3/12* | (2006.01) |
| *G06T 7/11* | (2017.01) |
| *G06T 7/194* | (2017.01) |
| *G06T 11/60* | (2006.01) |

(52) U.S. Cl.
CPC ....... *H04N 1/00461* (2013.01); *G06F 3/1206* (2013.01); *G06F 3/1208* (2013.01); *G06F 3/1242* (2013.01); *G06F 3/1245* (2013.01); *G06F 3/1247* (2013.01); *G06F 3/1256* (2013.01); *G06K 15/1801* (2013.01); *G06K 15/189* (2013.01); *G06K 15/1815* (2013.01); *G06K 15/1822* (2013.01); *G06K 15/1849* (2013.01); *G06K 15/1878* (2013.01); *G06T 7/11* (2017.01); *G06T 7/194* (2017.01); *G06T 11/60* (2013.01); *H04N 1/0044* (2013.01); *H04N 1/00413* (2013.01); *H04N 1/0405* (2013.01); *H04N 1/40062* (2013.01); *H04N 1/60* (2013.01); *G06T 2207/10008* (2013.01)

(58) Field of Classification Search
None
See application file for complete search history.

(56) References Cited

U.S. PATENT DOCUMENTS

| | | | |
|---|---|---|---|
| 6,987,879 B1 * | 1/2006 | Suino | G06K 9/38 358/466 |
| 7,242,802 B2 | 7/2007 | Curry et al. | |
| 7,307,760 B2 | 12/2007 | Jacobs et al. | |
| 7,737,990 B2 * | 6/2010 | Minowa | H04N 1/465 345/589 |
| 8,014,560 B2 | 9/2011 | Nafarieh et al. | |
| 8,180,153 B2 * | 5/2012 | Malik | G06K 9/38 382/176 |
| 8,224,073 B2 | 7/2012 | Nuuja et al. | |

(Continued)

*Primary Examiner* — Scott A Rogers
(74) *Attorney, Agent, or Firm* — Gibb & Riley, LLC (57) ABSTRACT

Methods and devices process an electronic image of an item that has a background color and line features of a second color distinct from the background color. An electronic image and a menu option are displayed to allow the user to define at least one area of the electronic image as a distinctive color region. The electronic image is separated into different planes, and line features within the distinctive color region are removed from a second mask plane (second color) and added to a third mask plane (third color). The first plane, second mask plane, and third mask plane, are combined into an electronic file, and automatically stored.

12 Claims, 10 Drawing Sheets

(56) References Cited

U.S. PATENT DOCUMENTS

| | | | |
|---|---|---|---|
| 8,285,035 B2* | 10/2012 | Malik | H04N 1/40062 382/164 |
| 8,306,345 B2* | 11/2012 | Malik | G06T 11/60 382/176 |
| 8,345,998 B2 | 1/2013 | Malik et al. | |
| 8,606,014 B2* | 12/2013 | Matsuda | G06T 7/0081 382/166 |
| 8,644,602 B2* | 2/2014 | Chen | H04N 1/58 358/515 |
| 8,849,031 B2 | 9/2014 | Handley | |
| 2010/0246951 A1* | 9/2010 | Chen | H04N 1/58 382/167 |

* cited by examiner

CUSTOMIZED COLOR FOR MULTIPLE RASTER CONTENT FORMAT FILE

BACKGROUND

Systems and methods herein generally relate to processing electronic images, and more specifically to working with electronic images that are in the multiple raster content (MRC) format.

In addition to offering different resolutions, different compression schemes are offered to reduce the file size of color images. One of the popular compression/file formats currently being offered is Mixed or Multiple Raster Content (MRC) representation. The MRC representation provides as a way to achieve high image quality with small file size. The MRC representation of documents is versatile and provides the ability to represent color images as either color or monochrome text.

An image may generally include different types of features, for example, black text on a white background, dark color text on a light color background, light color text on dark color background, etc. The MRC representation enables the use of multiple "planes" or layers for the purpose of representing such documents. For example, a foreground plane may contain only the information of the color of the text, a binary selector or mask plane contains the pixels of the text, and a background plane may contain only the information relating to the background color.

Thus, the selector or mask layer contains high spatial frequency information for regions otherwise having slowly changing color information. In effect, regions whose color changes relatively slowly, if at all, are placed onto the foreground layer. When the image represented by the data structure is to be rendered or otherwise generated, the color information stored in the foreground plane has spatial or shape attributes applied to it based on the binary information stored in the mask plane and the resulting shaped color information is combined onto the background plane to form the reconstructed plane.

In one example, an N-layer MRC process may utilize a single background plane with multiple foreground planes. The N-layer MRC process separates the foreground layer into various independent sublayers based on color and spatial proximity of the pixels. Each of the foreground sublayers is generally binarized having a specific color. In the N-layer MRC process, more than one foreground sublayer may have the same color (e.g., different masks include colored data). Thus, each of the layers has a respective portion of the information to be graphically displayed in the document. In this manner, colored masks are overlaid on each other to generate the MRC image of the document.

SUMMARY

Exemplary methods herein receive an electronic image of an item into a computerized device. The item has a background color and line features (e.g., text, line art, etc.) of a second color that is distinct from the background color. Such methods display, on a user interface, the electronic image and a menu option to define at least one area of the electronic image as a distinctive color region (the user interface is operatively connected to the computerized device). In response, the user interface receives input from the user to identify at least one area of the electronic image as the distinctive color region.

These methods then automatically separate the electronic image into different planes, using the computerized device. More specifically, a first plane of the planes contains continuous tone information of only pixels of the background color, a second mask plane of the planes contains binary information (meaning only pixel on/off data) of only the line features, and the second mask plane is used with a corresponding second foreground plane identifying the second color.

Additionally, these methods automatically remove the line features within the distinctive color region from the second mask plane and add the line features within the distinctive color region to a third mask plane that contains binary information (using the computerized device). The third mask plane is used with a corresponding third foreground plane having a third color distinct from the background color and the second color. Then, such methods automatically combine the first plane, the second mask plane, the second foreground plane, the third mask plane, and the third foreground plane into an electronic file, using the computerized device, and automatically store the electronic file in a machine-readable memory storage device using the computerized device.

Additional methods herein that are used with a scanning device receive an indication into the scanning device to begin scanning an item. The item has a background color and line features of a second color that is distinct from the background color. These methods perform an optical scan of the item using the scanning device to produce an electronic image. Such methods display (on a user interface of the scanning device) the electronic image and a menu option to define at least one area of the electronic image as a distinctive color region. In response, these methods receive input from the user into the user interface to identify at least one area of the electronic image as the distinctive color region.

Then, these methods automatically separate the electronic image into different planes using a processor of the scanning device. More specifically, a first plane of the planes contains information of only pixels of the background color, a second mask plane of the planes contains information of only the line features (and the second mask plane is used with a corresponding second foreground plane identifying the second color).

These methods automatically remove the line features within the distinctive color region from the second mask plane and add the line features within the distinctive color region to a third mask plane using the processor. The third mask plane is used with a corresponding third foreground plane having a third color distinct from the background color and the second color. The process of automatically removing the line features within the distinctive color region from the first plane and adding the line features within the distinctive color region to the third mask plane changes the color of the line features to be different from corresponding line features of the electronic image.

Such methods automatically combine the first plane, the second mask plane, the second foreground plane, the third mask plane, and the third foreground plane into an electronic file using the processor. The electronic file is in the multiple raster content (MRC) format, where the first plane has continuous-tone (contone) data of the MRC format, and the second mask plane and the third mask plane have binary data of the MRC format.

Such methods can also render the electronic file into a visible document by displaying the visible document on a graphic user interface, or printing the visible document on print media using a printer that is operatively connected to the computerized device, etc. The visible document has the line features in the second color on the background color (except for the line features within the distinctive color region) and the line features within the distinctive color region have the third color on the background color.

Exemplary scanning devices herein include, among other components, an optical scanner, a processor operatively connected to the optical scanner, a user interface operatively connected to the processor, etc. The user interface receives an indication to begin scanning an item. The item has a background color and line features of a second color distinct from the background color.

The scanner performs an optical scan of the item to produce an electronic image. The user interface displays the electronic image and a menu option to define at least one area of the electronic image as a distinctive color region and, in response, the user interface receives input to identify at least one area of the electronic image as the distinctive color region.

The processor automatically separates the electronic image into different planes. A first plane of the planes contains information of only pixels of the background color, a second mask plane of the planes contains information of only the line features, and the second mask plane is used with a corresponding second foreground plane identifying the second color.

The processor automatically removes the line features within the distinctive color region from the second mask plane and adds the line features within the distinctive color region to a third mask plane. The third mask plane is used with a corresponding third foreground plane having a third color distinct from the background color and the second color. Having the processor automatically remove the line features within the distinctive color region from the first plane and add the line features within the distinctive color region to the third mask plane changes the color of the line features to be different from corresponding line features of the electronic image.

The processor automatically combines the first plane, the second mask plane, the second foreground plane, the third mask plane, and the third foreground plane into an electronic file. The electronic file is in the multiple raster content (MRC) format, where the first plane has continuous-tone data of the MRC format, and the second mask plane and the third mask plane have binary data of the MRC format. The processor can render the electronic file into a visible document by displaying the visible document on a graphic user interface that is operatively connected to the processor, or printing the visible document on print media using a printer that is operatively connected to the processor, etc. The visible document has the line features in the second color on the background color (except for the line features within the distinctive color region) and the line features within the distinctive color region have the third color on the background color.

Data structures herein have machine-readable information for storage in a memory device that when implemented by a processor renders an image. The data structure has an electronic image separated into different planes. More specifically, the electronic image has a background color and line features of a second color distinct from the background color. A first plane of the planes contains information of only pixels of the background color. A second mask plane of the planes contains information of only the line features. The second mask plane is used with a corresponding second foreground plane identifying the second color.

A third mask plane of the planes contains information of only line features removed from a user-selected distinctive color region of the second mask plane. The third mask plane is used with a corresponding third foreground plane having a third color distinct from the background color and the second color. The third mask plane changes the color of the line features to be different from corresponding line features of the electronic image.

The first plane, the second mask plane, the second foreground plane, the third mask plane, and the third foreground plane are combined into an electronic file. The electronic file is in the multiple raster content (MRC) format, where the first plane has continuous-tone data of the MRC format, and the second mask plane and the third mask plane have binary data of the MRC format. The electronic file can be rendered into a visible document by displaying the visible document on a graphic user interface, or printing the visible document on print media using a printer, etc. The visible document has the line features in the second color on the background color (except for the line features within the user-selected distinctive color region) and the line features within the user-selected distinctive color region have the third color on the background color.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As noted above, in the Mixed or Multiple Raster Content (MRC) format, text data is stored as a binary mask layer with the color being tagged in a corresponding foreground layer. This disclosure relates to allowing the user to change the color of a portion or all of the text regions in a scan to MRC file.

The N-layer MRC format is preferred for its sharp text quality with color and lesser file size. The color of text in the MRC file is based on the original color of text in the document, and if a user wants to assign some specific color to a certain part of the document to attract the attention of the reader or for other purposes, they could accomplish such by using advanced imaging software which handles normal contone image format. However, this disclosure presents the option of allowing the user to change the color of text regions while scanning to file.

These processes use the MRC layers to record the output of color editing desired by the user by displaying, on a user interface, the scanned electronic image and a menu option to define at least one area of the electronic image as a distinctive color region. There are a number of ways for the user to specify the color adjustment, and the choice could depend on the workflow. For example, the specification can be done through a pre-defined template, or through selection on the scan preview in the user interface with help of a touch screen.

Therefore, the methods and systems herein use the MRC layers to allow the user to customize the color of specific area of the scanned electronic image, which enhances user experience in scan to file without increasing the file size. By allowing the user to assign different colors to different text, keywords, or user filled regions, in a form that will be scanned produces advantages for data entry operators.

The methods and devices herein also address some of the challenges in using MRC format. When MRC misclassification occurs, some text may be pushed to the image layer, which may lead to non-uniform appearance. Also, unwanted color change can happen as a result of segmentation errors. The option to change color based on user specification rectifies these issues in many cases by presuming that the user-defined distinctive color region is a text region.

The devices and methods herein do not increase file size, since the only change is in the color code of the mask layer. Further, such devices and methods provide the ability to create color customization using N-Layer MRC format, allow uniform color coding for archives or data entry, avoid text segmentation errors by forcing the region to text layer, and thereby provide a better user experience and usability.

Figure 1:
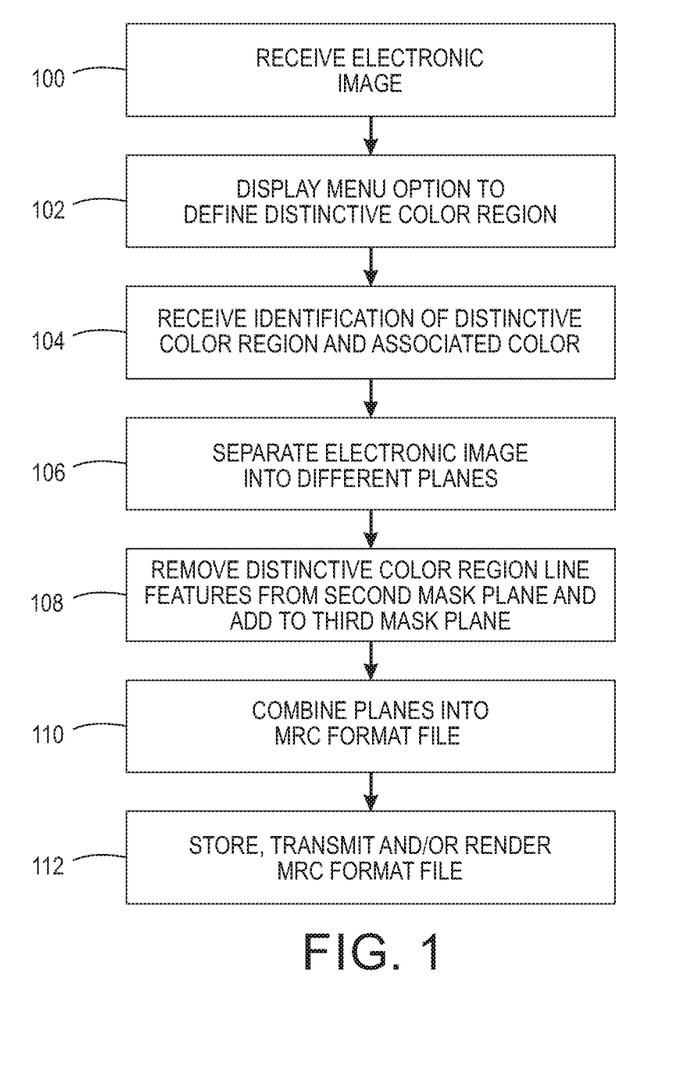
FIG. 1 is a flow diagram of various methods herein.
Figure 2:
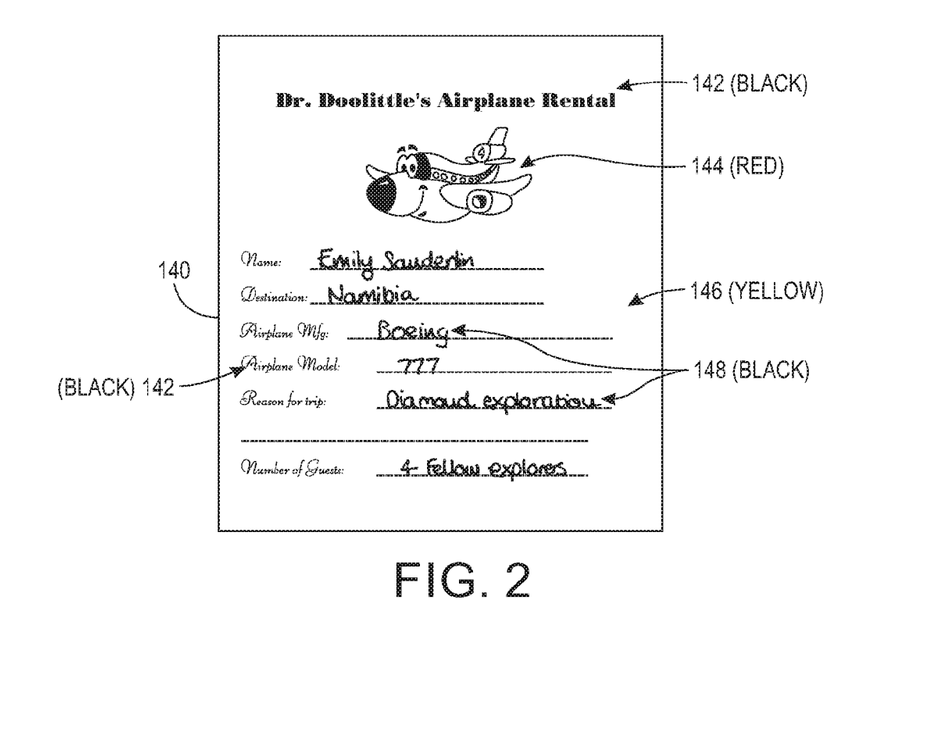
FIG. 2 is a schematic diagram illustrating a scanned electronic image used herein.

FIG. 1 is flowchart illustrating exemplary methods herein. As shown in item 100, some exemplary methods herein receive an electronic image of an item into a computerized device. FIG. 2 illustrates an exemplary electronic image 140 that can be supplied or produced by performing a scan of a physical document. As shown in FIG. 2, the electronic image 142 includes areas of a preprinted form 142 that are in the color black, a logo or other artwork 144 that is in the color red, hand written characters 148 (that in this example are also in the color black) that a user has supplied to the form, and all these items 140, 144, and 148 appear on a sheet having a yellow background 146. Therefore, as shown in FIG. 2, the item 140 has a background color 146 and line features 142 and 148 of a second color that is distinct from the background color 146.

In item 102, such methods display, on a user interface, menu options to define at least one area of the electronic image as a distinctive color region and the distinctive color. For example, in item 102 such methods can display (on a user interface of the scanning device) the scanned electronic image and a menu option to define at least one area of the electronic image as a distinctive color region. Alternatively, the user is allowed to select a previously existing template on the user interface. An example of the menu processing shown in item 102 is shown in FIG. 3.

Figure 3:
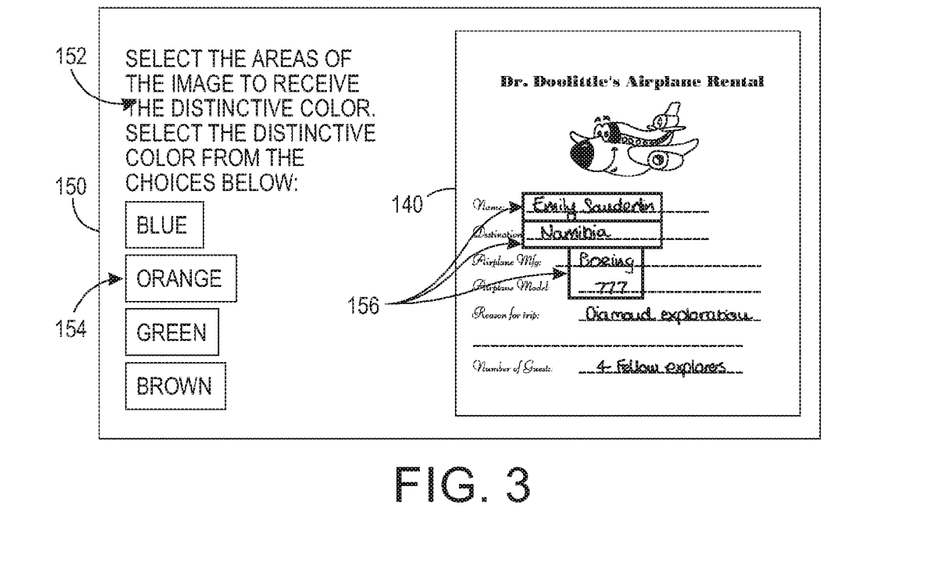
FIG. 3 is a schematic diagram illustrating a user interface display herein.

More specifically, as shown in FIG. 3, the electronic image 140 can be presented on the user interface 150, which can include pointing devices and/or a touch screen. FIG. 3 also illustrates menu instructions 152 informing the user to graphically select the areas of the image 140 that are to receive the distinctive color, and to select the distinctive color from the choices 154 presented. In this example, the user has used a touchscreen or pointing device of the user interface 150 of the scanning device to select different areas 156 of the scanned image 140 as the distinctive color regions. In this example, the user's handwritten entries for name, destination, airplane manufacturer, and airplane model have been selected to receive the distinctive color. Here, the user may have selected these fields to allow a subsequent data entry operator to focus on these fields when performing subsequent data entry of the scanned image. Note that, as shown in FIG. 3, individual lines can be selected as distinctive color regions or larger areas of multiple lines of text can be selected as the distinctive color regions.

Figure 4:
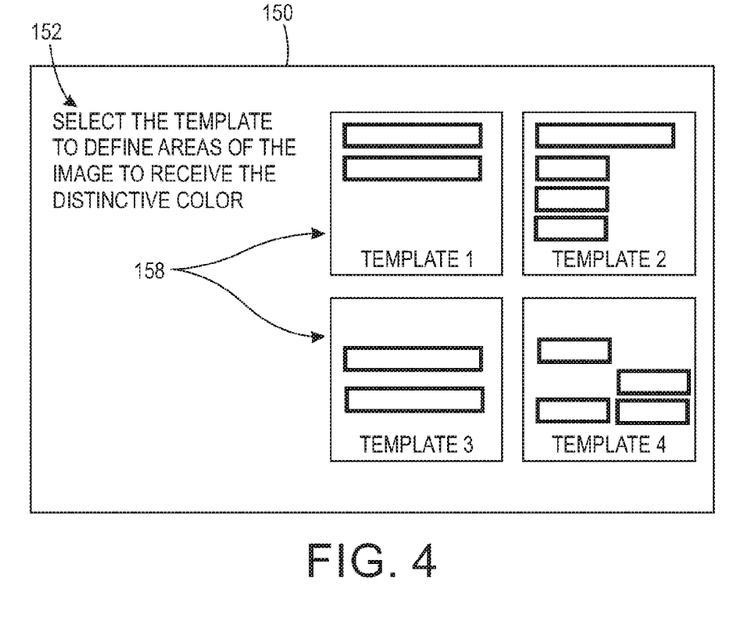
FIG. 4 is a schematic diagram illustrating a user interface display herein.

Thus, in FIG. 3, the user is allowed to define the distinctive color region on the scan preview in the user interface with help of a touch screen or in the scan driver. Alternatively, in the processing in item 102 in FIG. 1, the user can select a previously established template from a choice of many different templates (for example, the templates can have coordinates of the selected regions and the assigned colors). FIG. 4 illustrates an example of the user interface 150 presenting menu instructions 152 for the user to select the template to define areas of the image that will receive the distinctive color. The choices of four different templates are shown as item 158 in FIG. 4. As can be seen in FIG. 4, the different templates have different sized and located boxes that defined different distinctive color regions in each different template 158. Further, each template 158 can include a previously established color choice, or the user can be provided with the color choice using a color choice menu similar to that shown in FIG. 3.

In response to the menu options presented to the user and item 102 in FIG. 1, in item 104, the user interface receives input from the user to identify at least one area of the electronic image as the distinctive color region, and the associated color that will be used for the one or more distinctive color regions. This is also shown in FIG. 3 where the user has selected distinctive color regions 156.

As shown in item 106, these methods then automatically separate the electronic image into different planes, using the computerized device. This is shown graphically in FIG. 5, where the processing in item 106 generates a first plane (e.g., a yellow background plane 178) that contains information of only pixels of the background color, a second mask plane (e.g., black text plane 176) that contains binary information (meaning only pixel on/off data) of only the text and line features, and a corresponding second foreground plane (e.g., black color plane 174) identifying the second color of the second mask plane. Therefore, according to MRC format processing, the black mask plane 176 only includes the text and line art 142 shown in FIG. 2. The processing in item 106 can also produce additional planes, such as the red mask plane 172 (which includes graphic feature 144 from FIG. 2) and a corresponding red foreground plane 170.

Additionally, in item 108, these methods automatically remove the line features within the distinctive color region from the second mask plane and add those same line features within the distinctive color region to a third mask plane (using the computerized device). The third mask plane is used with a corresponding third foreground plane identifying a third color distinct from the background color and the second color. The processing in item 108 is shown graphically in FIG. 6 where the text and a line art from the distinctive color regions 156 in the black mask plane 176 are transferred to an additional blue mask plane 182. In essence, the pixels from the distinctive color regions 156 are subtracted from the second mask plane (black mask plane 176) and added to the third mask plane (blue mask plane 182).

Figure 5:
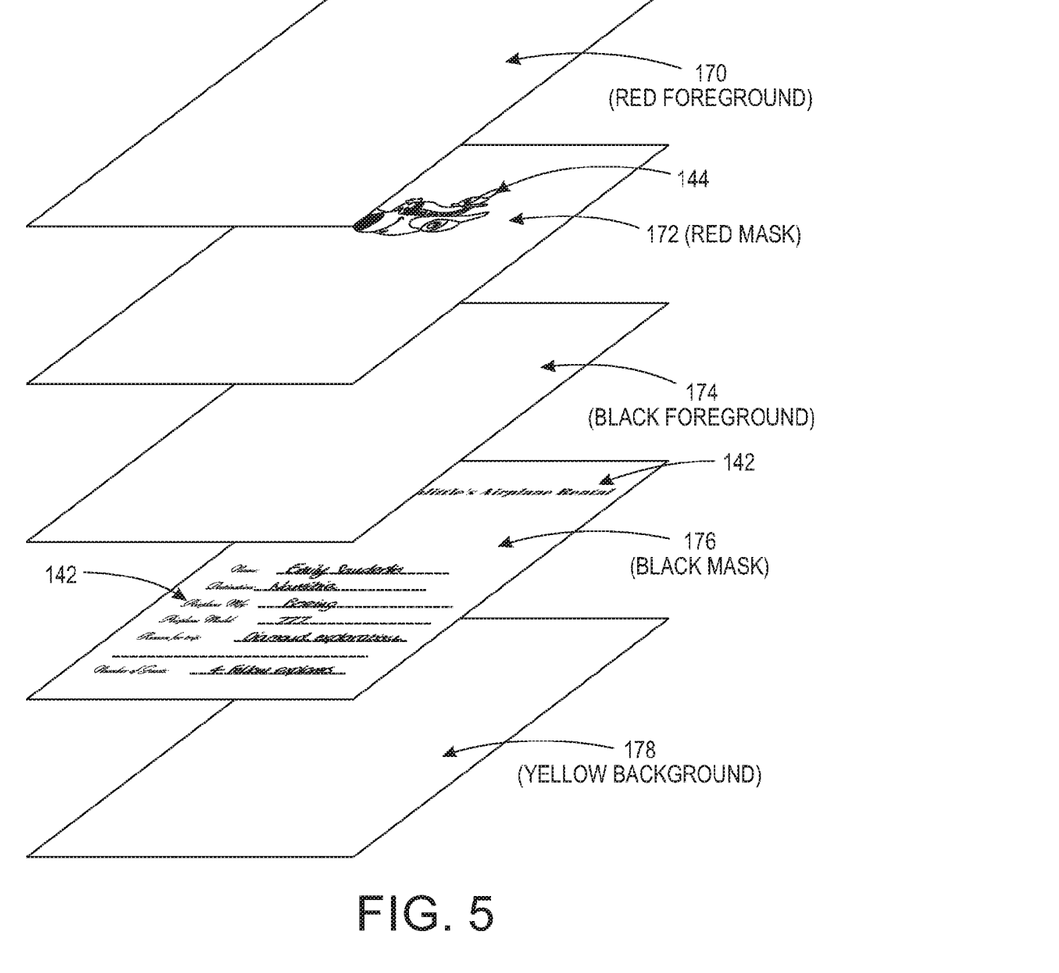
FIG. 5 is a schematic diagram illustrating planes of an electronic image produced herein.
Figure 6:
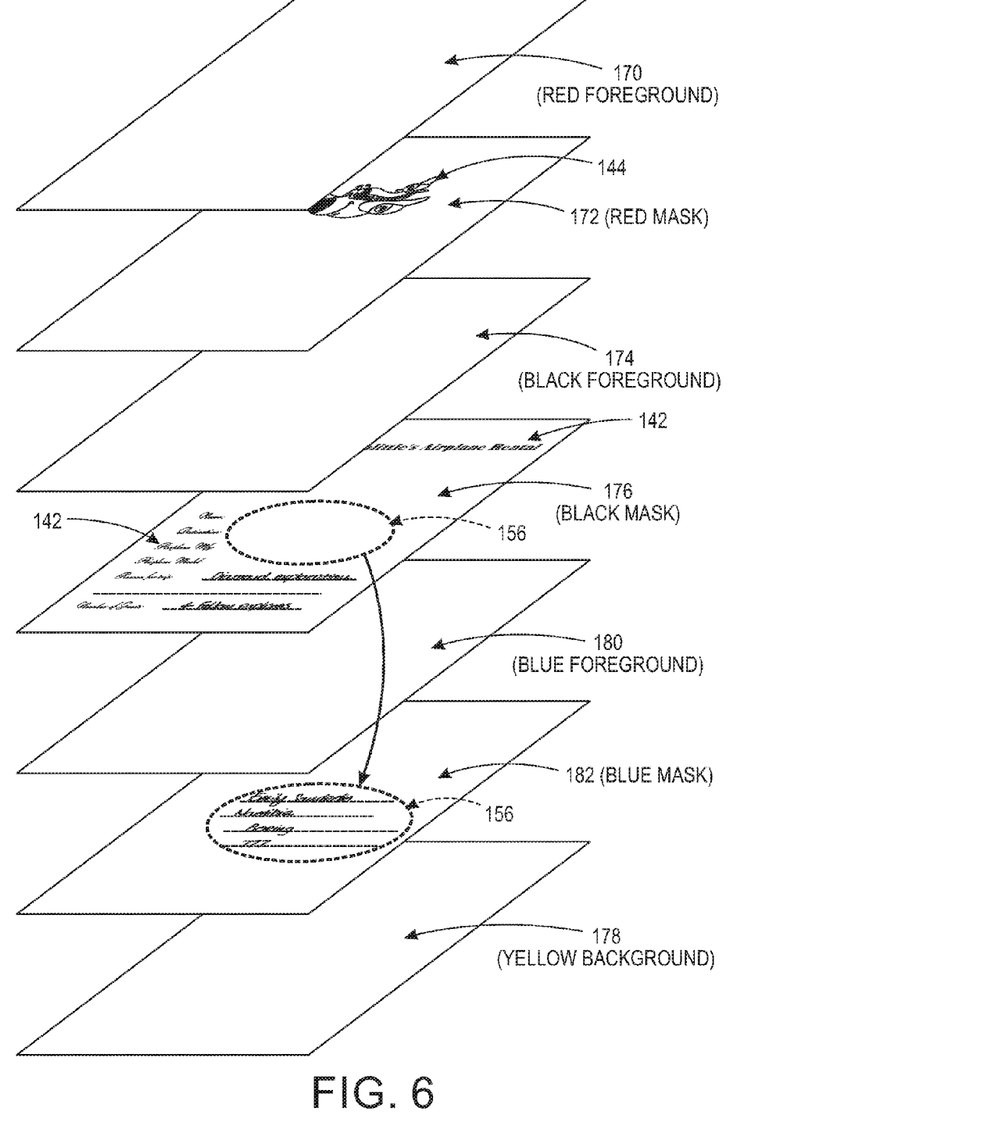
FIG. 6 is a schematic diagram illustrating planes of an electronic image produced herein.

FIG. 6 also illustrates the additional blue foreground plane 180 that corresponds to the blue mask plane 182 (and otherwise the remaining planes are as shown in FIG. 5). Note that while the processing in items 106 and 108 are shown as separate items (and are illustrated separately in FIGS. 5 and 6) such processing can occur simultaneously within a single step, and such processing is illustrated separately only to allow the reader to more fully understand the processes being disclosed herein.

As shown in item 110, such methods automatically combine the first plane, the second mask plane, the second foreground plane, the third mask plane, and the third foreground plane into a MRC format electronic file, using the computerized device. As is understood by those ordinarily skilled in the art, a file with the MRC format is smaller than a file that records all information of each pixel in the image. In addition, the processing described herein does not increase the size of the MRC file because data from one plane (black mask plane 176) is merely relocated to another plane (blue mask plane 182) and this does not increase the size of the file because no additional data is added to the MRC format file.

Figure 7:
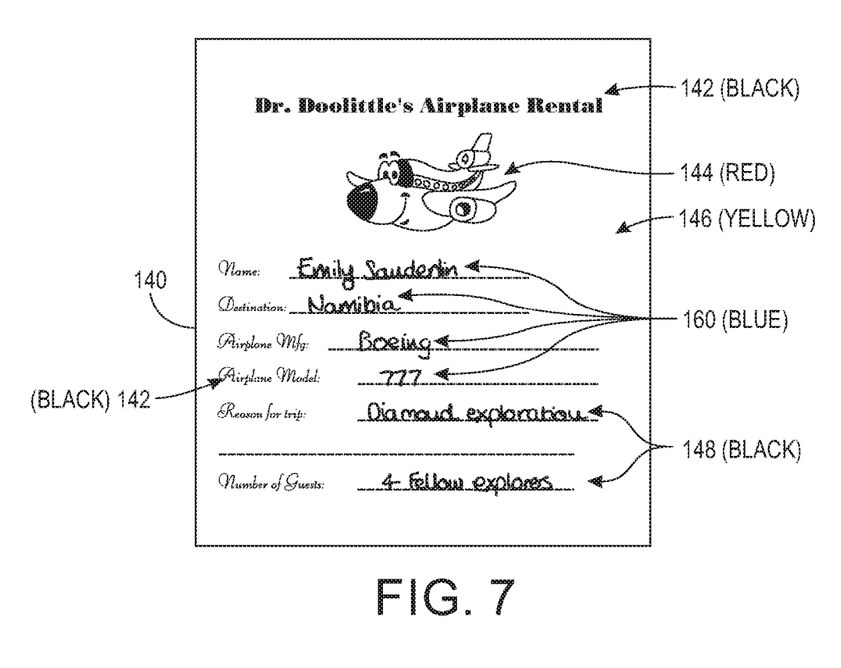
FIG. 7 is a schematic diagram illustrating a rendered document produced herein.

In item 112 in FIG. 1, the MRC format electronic file can be stored in a machine-readable memory storage device using the computerized device, transmitted to a different device, or rendered by being printed using a printer or displayed on a user interface, etc. FIG. 7 illustrates one example of the image shown in FIG. 2 being rendered after the processing described above. As can be seen by comparing FIGS. 2 and 7, the handwritten markings and line art within the distinctive color regions 156 is now rendered in a blue color as contrasted to the black color of the other text, hand written markings, and line art 142, 148. Again, such distinctive coloring can help subsequent data entry personnel more easily recognize the data within the distinctive color region 156 of the image 140.

Figure 8:
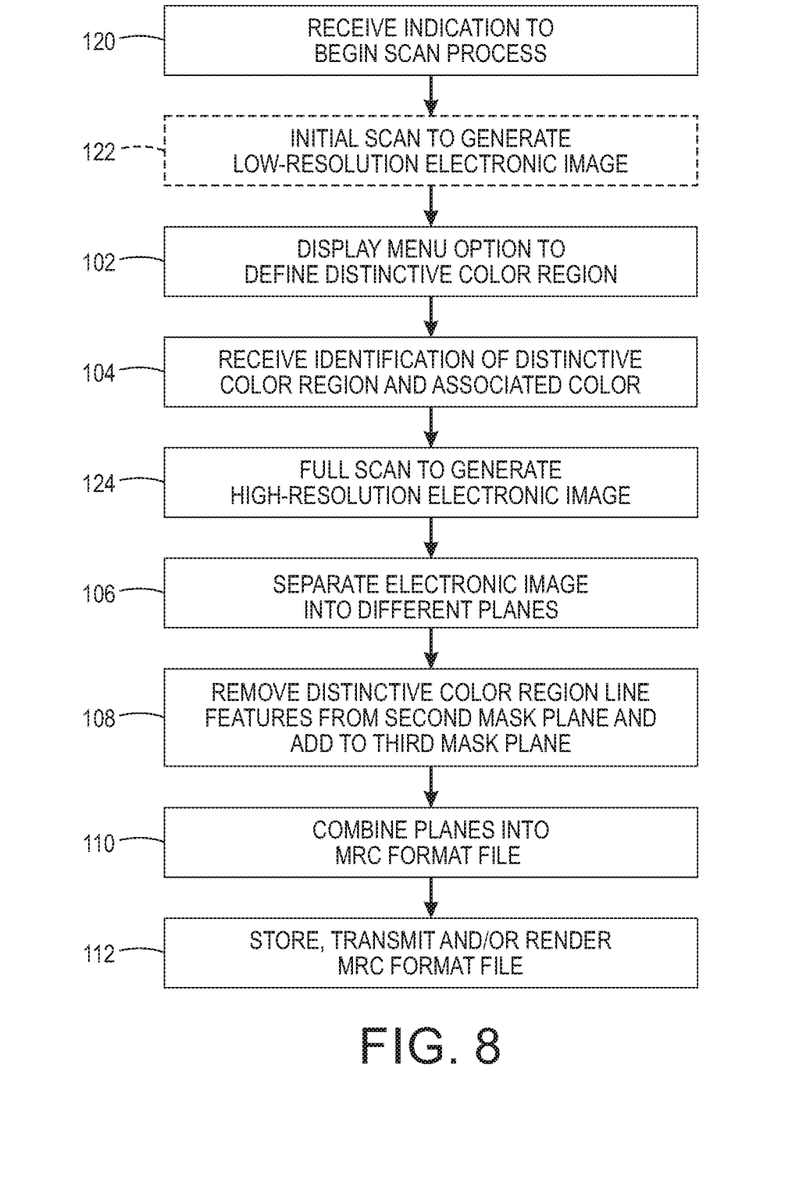
FIG. 8 is a flow diagram of various methods herein.

Some methods herein are performed entirely using a stand-alone scanning device (which includes a processor and a user interface, and may include a printer, communication equipment, etc.) and may be performed without interaction with any other equipment or machines. FIG. 8 illustrates such processing. In item 120 in FIG. 8, these methods receive an indication into the scanning device to begin scanning an item, such as the user pushing a scan button on a menu option of the user interface of the scanning device.

As shown in FIG. 3, discussed above, the scanned electronic image 140 may be presented on the user interface 150 to allow the user to graphically select the distinctive color regions 156. The full, high-resolution scan image can be used for this purpose, or a preliminary relatively lower resolution scan can be used for this purpose. Therefore, FIG. 8 illustrates the optional process, in item 122, where these methods perform an initial (relatively low-resolution) optical scan of the item (also represented by item 140 in FIG. 2) using the scanning device to produce a displayable electronic image. As described above, in item 102, such methods display (on a user interface of the scanning device) menu options to define the one or more distinctive color regions, and to select the distinctive color. In response, in item 104, these methods receive input from the user into the user interface to identify at least one area of the electronic image as the distinctive color region.

The item is then subjected to a relatively higher-resolution optical scanning process in item 124 in FIG. 8 that generates an electronic image 140 that is processed as described above. During the scanning processes, the region defined by the coordinates can be treated as text region and a binary mask is created with the color specified in the template. As a variant, the detected text content within the defined coordinated is assigned to the selected color, while the image content is retained in the original color. One time definition of the template can be applied for a batch scanning, and the template may be stored and loaded when required.

Processing items 106-112 are then performed on the scanned image 140, as described above. Therefore, data structures herein have machine-readable information for storage in a memory device that when implemented by a processor renders an image. The data structure has an electronic image separated into different planes, as shown in FIG. 6. More specifically, the electronic image has a background color and line features of a second color distinct from the background color. A first plane 178 of the planes contains information of only pixels of the background color. A second mask plane 176 of the planes contains information of only the line features. The second mask plane is used with a corresponding second foreground plane 174 identifying the second color. A third mask plane 182 of the planes contains information of only line features removed from a user-selected distinctive color region 156 of the second mask plane 176. The third mask plane 182 is used with a corresponding third foreground plane 180 having a third color distinct from the background color and the second color. The third mask plane 182 changes the color (160) of the line features to be different from corresponding line features of the electronic image (as shown when comparing FIGS. 2 and 7).

The first plane, the second mask plane, the second foreground plane, the third mask plane, and the third foreground plane are combined into an electronic file. The electronic file is in the multiple raster content (MRC) format, where the first plane has continuous-tone data of the MRC format, and the second mask plane and the third mask plane have binary data of the MRC format. The electronic file can be rendered into a visible document by displaying the visible document on a graphic user interface, or printing the visible document on print media using a printer, etc. The visible document has the line features in the second color on the background color (except for the line features within the user-selected distinctive color region) and the line features within the user-selected distinctive color region have the third color on the background color.

Figure 9:
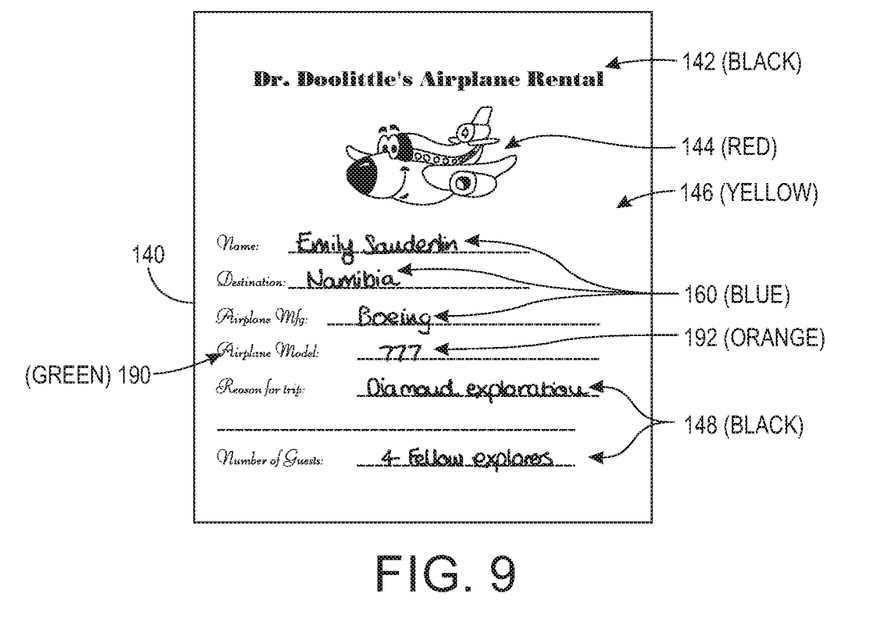
FIG. 9 is a schematic diagram illustrating a rendered document produced herein.

In addition to the foregoing, the devices and methods herein provide many features and capabilities. For example, different colors can be enabled, based on the text size, and this is shown in FIG. 9, where separate mask and color planes are added to render the smaller printed text 190 as another distinctive color, such as green. FIG. 9 is a schematic diagram illustrating a rendered document produced herein. Additionally, the scan can be subjected to any form of character recognition process, such as optical character recognition (OCR), and color codes can be enabled for certain recognized keywords or numerical values, and such colors can also be enabled for coordinates near such keywords. This is shown in FIG. 9, where separate mask and color planes are added to render the OCR recognized keyword "777" 192 as another distinctive color, such as orange. The devices and methods herein also provide the capability of hand written and printed text differentiation, where different content may be assigned with different colors. This is shown in FIG. 9, where separate mask and color planes are added to render the printed text 190 green, and the handwritten text blue 160, orange 192, and black 148.

Figure 10:
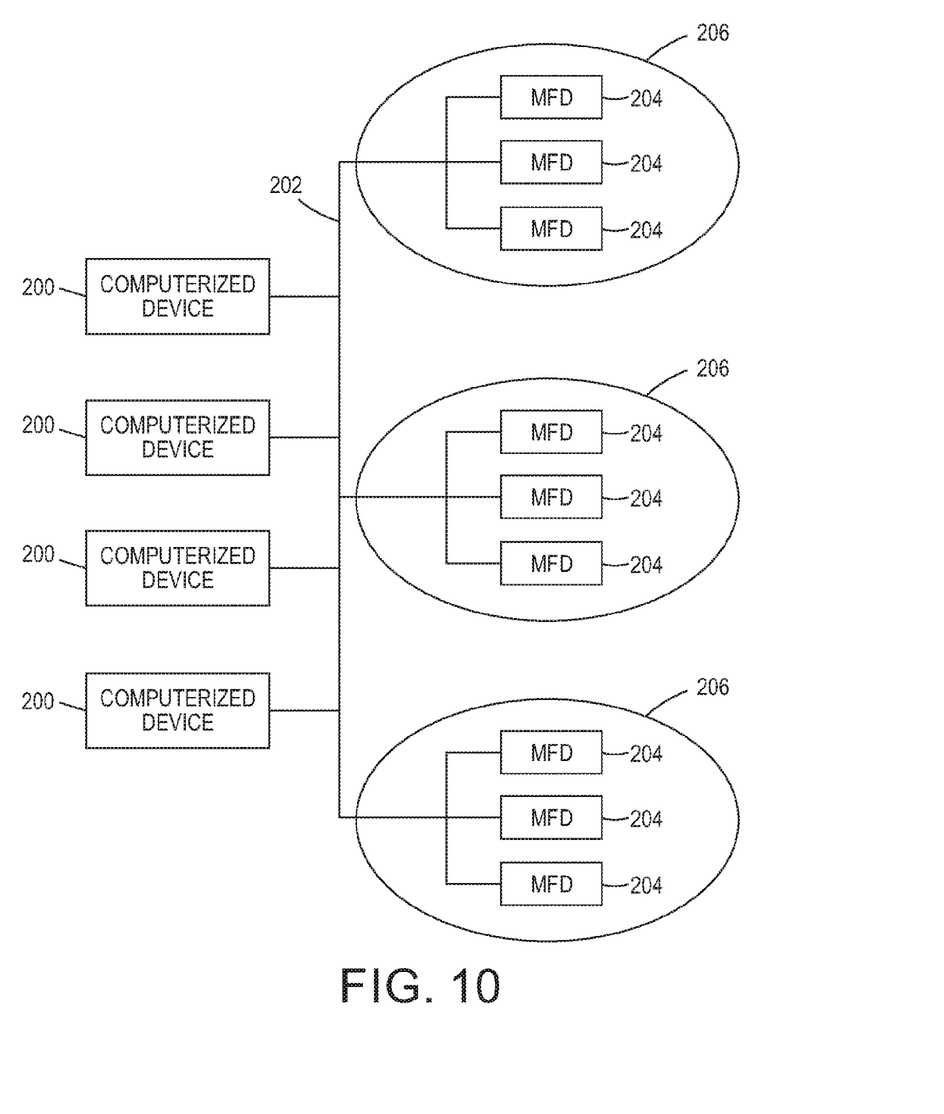
FIG. 10 is a schematic diagram illustrating systems herein.

All the processing described herein, can be performed locally at the scanner, or can be performed offline using the archived scanned file. Therefore, as shown in FIG. 10, exemplary systems and methods herein include various computerized devices 200, 204 located at various different physical locations 206 that perform the processing described above. The computerized devices 200, 204 can include print servers, printing devices, personal computers, etc., and are in communication (operatively connected to one another) by way of a local or wide area (wired or wireless) network 202.

Figure 11:
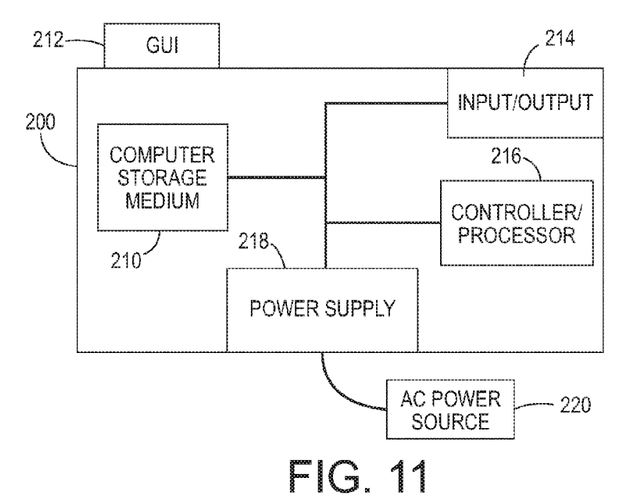
FIG. 11 is a schematic diagram illustrating devices herein.

FIG. 11 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 11, a body housing has one or more functional components that operate on power supplied from an alternating current (AC) source 220 by the power supply 218. The power supply 218 can comprise a common power conversion unit, power storage element (e.g., a battery, etc), etc.

Figure 12:
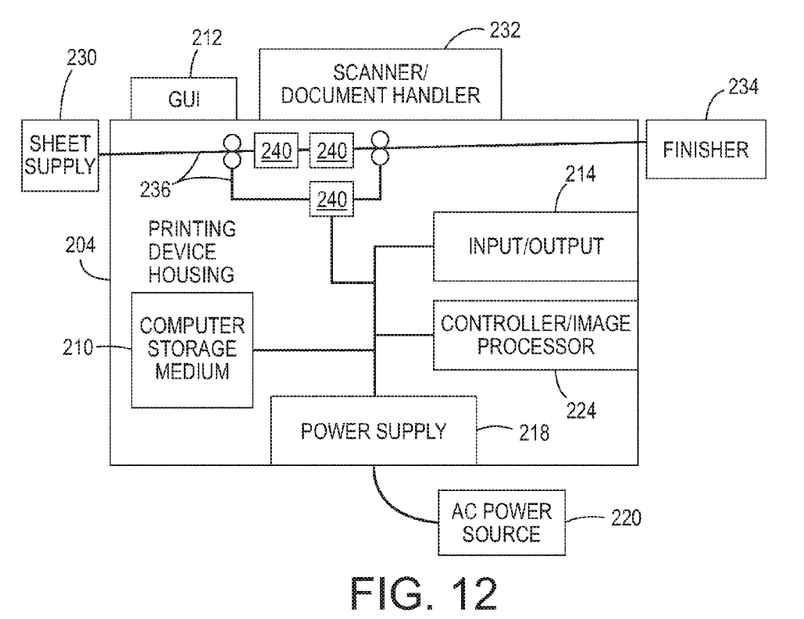
FIG. 12 is a schematic diagram illustrating devices herein.

FIG. 12 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, exemplary scanning devices 232 herein include, among other components, an optical scanner, a processor 216/224 operatively connected to the optical scanner, a user interface 212 operatively connected to the processor 216/224, etc. The user interface 212 receives an indication to begin scanning an item. The item has a background color and line features of a second color distinct from the background color.

The scanner performs an optical scan of the item to produce an electronic image. The user interface 212 displays the electronic image and a menu option to define at least one area of the electronic image as a distinctive color region and, in response, the user interface 212 receives input to identify at least one area of the electronic image as the distinctive color region.

The processor 216/224 automatically separates the electronic image into different planes. A first plane of the planes contains information of only pixels of the background color, a second mask plane of the planes contains information of only the line features, and the second mask plane is used with a corresponding second foreground plane identifying the second color.

The processor 216/224 automatically removes the line features within the distinctive color region from the second mask plane and adds the line features within the distinctive color region to a third mask plane. The third mask plane is used with a corresponding third foreground plane having a third color distinct from the background color and the second color. Having the processor 216/224 automatically remove the line features within the distinctive color region from the first plane and add the line features within the distinctive color region to the third mask plane changes the color of the line features to be different from corresponding line features of the electronic image.

The processor 216/224 automatically combines the first plane, the second mask plane, the second foreground plane, the third mask plane, and the third foreground plane into an electronic file. The electronic file is in the multiple raster content (MRC) format, where the first plane has continuous-tone data of the MRC format, and the second mask plane and the third mask plane have binary data of the MRC format. The processor 216/224 can render the electronic file into a visible document by displaying the visible document on a graphic user interface 212 that is operatively connected to the processor 216/224, or printing the visible document on print media using a printer 240 that is operatively connected to the processor 216/224, etc. The visible document has the line features in the second color on the background color (except for the line features within the distinctive color region) and the line features within the distinctive color region have the third color on the background color.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

A raster image processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s).

The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
  receiving an electronic image of an item into a computerized device, said item comprising a background color and line features of a second color distinct from said background color;
  displaying, on a user interface, said electronic image and a menu option to define at least one area of said electronic image as a distinctive color region, said user interface being operatively connected to said computerized device;
  receiving input into said user interface to identify at least one area of said electronic image as said distinctive color region;
  automatically separating said electronic image into different planes using said computerized device, a first plane of said planes containing information of only pixels of said background color, a second mask plane of said planes containing information of only said line features, and said second mask plane being used with a corresponding second foreground plane identifying said second color;

automatically removing said line features within said distinctive color region from said second mask plane and adding said line features within said distinctive color region to a third mask plane using said computerized device, said third mask plane being used with a corresponding third foreground plane identifying a third color distinct from said background color and said second color;

automatically combining said first plane, said second mask plane, said second foreground plane, said third mask plane, and said third foreground plane into an electronic file, using said computerized device;

rendering said electronic file into a visible document, said visible document having said line features in said second color on said background color, except for said line features within said distinctive color region, said line features within said distinctive color region having said third color on said background color.

2. The method according to claim 1, said electronic file being in the multiple raster content (MRC) format, said first plane comprising continuous-tone data of said MRC format, and said second mask plane and said third mask plane comprising binary data of said MRC format.

3. The method according to claim 1, said automatically removing said line features within said distinctive color region from said first plane and adding said line features within said distinctive color region to said third mask plane changes the color of said line features to be different from corresponding line features of said electronic image.

4. The method according to claim 1, further comprising automatically evaluating said electronic image; and based on said evaluating, automatically identifying an additional distinctive color region having a different color from said distinctive color region based on at least one of text size, recognized keywords, recognized numerical values, handwritten text, and printed text.

5. A method comprising:

receiving an indication into a scanning device to begin scanning an item, said item comprising a background color and line features of a second color distinct from said background color;

performing an optical scan of said item using said scanning device to produce an electronic image;

displaying, on a user interface of said scanning device, said electronic image and a menu option to define at least one area of said electronic image as a distinctive color region;

receiving input into said user interface to identify at least one area of said electronic image as said distinctive color region;

automatically separating said electronic image into different planes using a processor of said scanning device, a first plane of said planes containing information of only pixels of said background color, a second mask plane of said planes containing information of only said line features, and said second mask plane being used with a corresponding second foreground plane identifying said second color;

automatically removing said line features within said distinctive color region from said second mask plane and adding said line features within said distinctive color region to a third mask plane using said processor, and said third mask plane being used with a corresponding third foreground plane identifying a third color distinct from said background color and said second color;

automatically combining said first plane, said second mask plane, said second foreground plane, said third mask plane, and said third foreground plane into an electronic file using said processor; and rendering said electronic file into a visible document, said visible document having said line features in said second color on said background color, except for said line features within said distinctive color region, said line features within said distinctive color region having said third color on said background color.

6. The method according to claim 5, said electronic file being in the multiple raster content (MRC) format, said first plane comprising continuous-tone data of said MRC format, and said second mask plane and said third mask plane comprising binary data of said MRC format.

7. The method according to claim 5, said automatically removing said line features within said distinctive color region from said first plane and adding said line features within said distinctive color region to said third mask plane changes the color of said line features to be different from corresponding line features of said electronic image.

8. The method according to claim 5, further comprising automatically evaluating said electronic image; and based on said evaluating, automatically identifying an additional distinctive color region having a different color from said distinctive color region based on at least one of text size, recognized keywords, recognized numerical values, handwritten text, and printed text.

9. A scanning device comprising:

an optical scanner;

a processor operatively connected to said optical scanner;

a user interface operatively connected to said processor, said user interface receiving an indication to begin scanning an item, said item comprising a background color and line features of a second color distinct from said background color;

said scanner performing an optical scan of said item to produce an electronic image;

said user interface displaying said electronic image and a menu option to define at least one area of said electronic image as a distinctive color region;

said user interface receiving input to identify at least one area of said electronic image as said distinctive color region;

said processor automatically separating said electronic image into different planes, a first plane of said planes containing information of only pixels of said background color, a second mask plane of said planes containing information of only said line features, and said second mask plane being used with a corresponding second foreground plane identifying said second color;

said processor automatically removing said line features within said distinctive color region from said second mask plane and adding said line features within said distinctive color region to a third mask plane, and said third mask plane being used with a corresponding third foreground plane identifying a third color distinct from said background color and said second color;

said processor automatically combining said first plane, said second mask plane, said second foreground plane, said third mask plane, and said third foreground plane into an electronic file; and said processor automatically rendering said electronic file into a visible document, said visible document having said line features in said second color on said background color, except for said line features within said distinctive color region, said line features within said distinctive color region having said third color on said background color.

10. The scanning device according to claim 9, said electronic file being in the multiple raster content (MRC) format, said first plane comprising continuous-tone data of said MRC format, and said second mask plane and said third mask plane comprising binary data of said MRC format.

11. The scanning device according to claim 9, said processor automatically removing said line features within said distinctive color region from said first plane and adding said line features within said distinctive color region to said third mask plane changes the color of said line features to be different from corresponding line features of said electronic image.

12. The scanning device according to claim 9, said processor automatically evaluating said electronic image; and based on said evaluating, said processor automatically identifying an additional distinctive color region having a different color from said distinctive color region based on at least one of text size, recognized keywords, recognized numerical values, handwritten text, and printed text.

* * * * *